United States Patent

[11] 3,561,584

[72] Inventors Adolf Pinkhusovich Sinyavsky
ul. B. Porokhovskaya, 46, kv. 50;
Viktor Alexandrovich Bedeker, V.O. IO linia, 43, kv. 35, Leningrad, U.S.S.R.
[21] Appl. No. 736,189
[22] Filed June 11, 1968
[45] Patented Feb. 9, 1971

[54] APPARATUS FOR FEEDING PULPWOOD TO A CONVEYOR OF A DEVICE FOR CHARGING DEFIBER MAGAZINES
2 Claims, 1 Drawing Fig.

[52] U.S. Cl. .................................................... 198/45
[51] Int. Cl. .................................................. B65g 47/00
[50] Field of Search ........................................... 198/107, 106, 45—51, 60, 59, 61, 21

[56] References Cited
UNITED STATES PATENTS
3,340,991 9/1967 Bontempi ..................... 198/21

FOREIGN PATENTS
695,093 8/1940 Germany ..................... 198/61

Primary Examiner—Richard E. Aegerter
Attorney—Waters, Roditi, Schwartz and Nissen ABSTRACT: Pulpwood is fed from a vibratory table to a drum with grips which deposits the pulpwood onto a first guide in turn transferring the pulpwood to a conveyor which transports the pulpwood to a second guide, in turn transferring the pulpwood to a conveyor for charging defiber magazines. Both guides include displaceable members which are moved when pulpwood is present in the guides and these members act on respective switches which deactuate the drive of the preceding drum and conveyor respectively. Thus, when the first guide is loaded with pulpwood, the drum is at rest and when the second guide receives pulpwood from the first conveyor, the drive of the latter is terminated until the pulpwood has been transferred from the second guide to the conveyor for the defiber magazines.

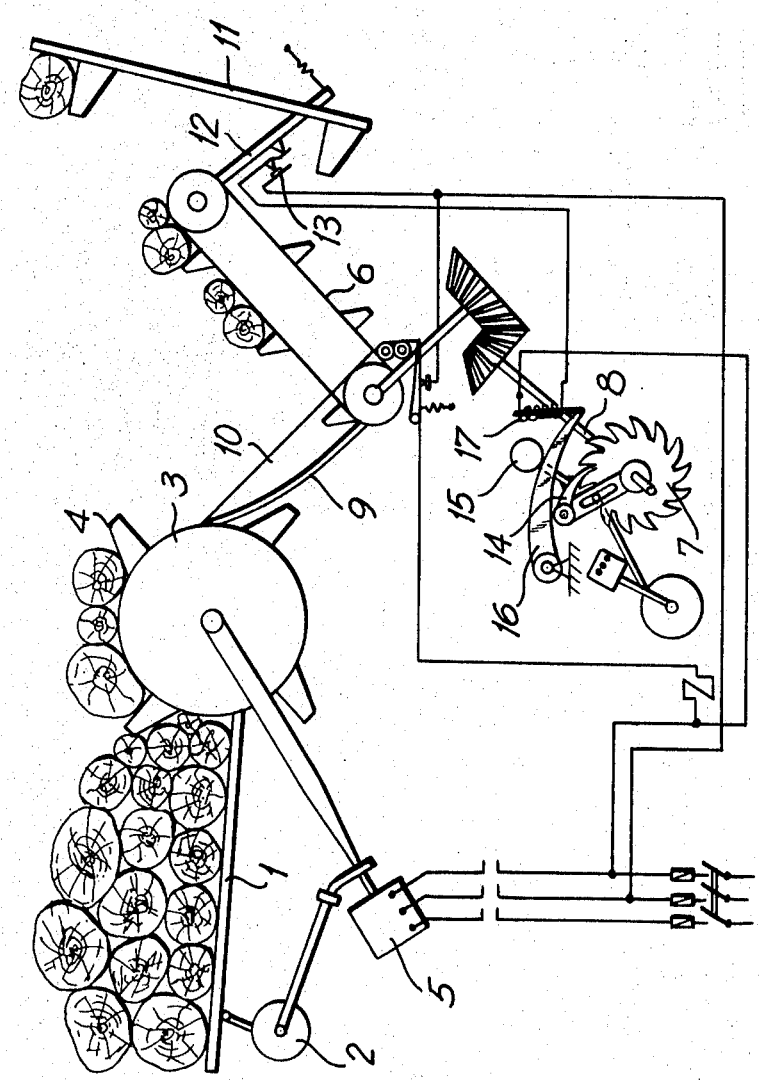

APPARATUS FOR FEEDING PULPWOOD TO A CONVEYOR OF A DEVICE FOR CHARGING DEFIBER MAGAZINES

The present invention relates to devices, used in the woodworking industry, and more particularly to apparatus for feeding pulpwood onto the conveyor of a continuous-action device for charging defibre magazines with pulpwood, intended for processing the pulpwood into pulp.

At present the pulpwood is fed onto the conveyors of the device for charging defibre magazines with pulpwood by means of a belt conveyor manually fed. This causes overfeeding, resulting in stopping the device.

An object of the present invention is to provide an automated arrangement ensuring regulated pulpwood feed onto the conveyors of the device for charging the defibre magazines with pulpwood.

This object is achieved by the improvement wherein the arrangement for feeding pulpwood onto the conveyor of the device for charging the defibre magazines with pulpwood, said arrangement being essentially a system, comprising a vibratory table and conveyor, a pickup or switch is installed at the place of transfer of the pulpwood from the arrangement conveyor onto the conveyor of the device for charging the pulpwood, said pickup being intended for feeding a signal to disengage the drive of the arrangement for feeding the pulpwood, the pickup operating under the action of the pulpwood.

It is expedient to actuate the conveyor of the arrangement for feeding the pulpwood by means of a ratchet gear, whose pawl is operatively connected to a movable core of an electromagnet, ensuring the disengagement of said pawl with the ratchet gear at a command of the pickup, disposed under the pulpwood guide, which is located at the place of transferring the pulpwood onto the conveyor of the device for the pulpwood charging and is deflected downwards under the action of the pulpwood until it bears against said pickup.

When the device operates under winter conditions, and the pulpwood is frozen together, in order to break the frozen bundles to ensure more regular pulpwood feeding onto the conveyor of the same device, a drum with grips for the pulpwood is installed between the vibratory table and conveyor, said drum being connected to the conveyor by means of a guide, carrying a pickup, operating under the action of the pulpwood and feeding a command to disengage the drum drive.

Given below is a detailed description of an embodiment of the invention with reference to the accompanying drawing, the sole figure of which shows diagrammatically and elevation view of the arrangement for feeding pulpwood onto the feeding conveyor of the device for automatically charging the defibre magazines with pulpwood, made in accordance with the invention.

The arrangement comprises an inclined table, vibrated by means of a crank mechanism 2, a drum 3 with grips 4 for the pulpwood, driven by an electric motor 5, and a conveyor 6, driven by means of a ratchet gear, whose ratchet wheel 7 is fitted on a driving shaft of the conveyor 6. The drum 3 and conveyor 6 are interconnected by means of a guide 9 with a pickup or switch 10 with a rope as the transmission element.

The conveyor 6 is connected to a feeding conveyor 11 of the device for automatically charging defibre magazines with pulpwood by means of a spring-loaded guide 12 with a pickup or switch 13, disposed under said guide and feeding a command to stop the conveyor 6. A pawl 14 of the ratchet gear is provided with a roller 15, which rolls along a guide 16, whose end is connected to the core of an electromagnet 17, connected to the pickup 13.

In operation, pulpwood piles are loaded onto the table for shaking the pile. The drum 3 with the help of the grips 4 transfers the pulpwood onto the guide 9. Simultaneously additional breading of the frozen log mass occurs.

When the pulpwood arrives on the guide 9, the pickup 10 operates and the drive of the drum 3 is disengaged. As soon as all the pulpwood is removed from the guide 9 by the conveyor 6, the drive of the drum 3 resumes its operation.

The pulpwood on the conveyor 6 arrives on the spring-loaded guide 12, which, when displaced, actuates the pickup 13, feeding a command to actuate the electromagnet 17, the core of said electromagnet deflecting the guide 16 when said core is being pulled inside. Simultaneously the pawl 14 of the ratchet gear is disengaged from the ratchet wheel 7 and the conveyor 6 is stopped.

As soon as all the pulpwood is removed from the guide 12 the conveyor 6 resumes its operation.

We claim:

1. Apparatus for feeding pulpwood to a charging conveyor for the supply of pulpwood to defibre magazines, said apparatus comprising a vibratory table for pulpwood, conveyor means for feeding pulpwood from the table towards the charging conveyor, drive means for said conveyor means, displaceable guide means for receiving pulpwood from the conveyor means and moving to a displaced position under the weight of the pulpwood to transfer the pulpwood to the charging conveyor, and switch means positioned adjacent said guide means and coupled to said drive means to deactivate the drive means when the guide means is in said displaced position, said drive means comprising a ratchet gear with a pawl, and said switch means comprising s switch actuated by said guide means in the displaced position thereof and an electromagnet coupled to said switch and pawl to disengage the latter from the ratchet gear when the switch is actuated.

2. Apparatus as claimed in claim 1 comprising a drum with grips for the pulpwood placed between said table and said conveyor means, drive means for said drum, a second displaceable guide means between said drum and said conveyor means for transferring pulpwood therebetween, and second switch means adjacent the second guide means and coupled to the drive means for the drum to deactivate the latter when the second guide means is displaced.